US00RE49344E

(19) United States
(12) Reissued Patent
Roosen et al.

(10) Patent Number: US RE49,344 E
(45) Date of Reissued Patent: Dec. 27, 2022

(54) LUGGAGE SHELL WITH SURFACE CONFIGURATION

(71) Applicant: HS New Travel GmbH, Berlin (DE)

(72) Inventors: Jan Roosen, Berlin (DE); Max Koriath, Berlin (DE)

(73) Assignee: HS New Travel GmbH, Berlin (DE)

(21) Appl. No.: 29/776,872

(22) Filed: Apr. 1, 2021

Related U.S. Patent Documents

Reissue of:
(64) Patent No.: Des. 889,836
Issued: Jul. 14, 2020
Appl. No.: 29/664,239
Filed: Sep. 24, 2018

(30) Foreign Application Priority Data

Mar. 22, 2018 (EP) ..... 004952505-0006
Mar. 22, 2018 (EP) ..... 004952505-0007

(51) LOC (13) Cl. ..... 03-01
(52) U.S. Cl.
USPC ..... D3/318
(58) Field of Classification Search
USPC ..... D3/273, 274, 276, 279, 281, 282, 283, D3/289, 291, 292, 318, 319, 321, 322, D3/902
CPC ..... A45C 5/14; A45C 5/00; A45C 2003/008; A45C 2005/032
See application file for complete search history.

(56) References Cited

U.S. PATENT DOCUMENTS

D679,495 S * 4/2013 Dolce ..... D3/243
D720,928 S * 1/2015 Roncato ..... D3/279
D732,823 S * 6/2015 Baron ..... D3/276
D755,518 S * 5/2016 Sijmons ..... D3/289
D767,270 S * 9/2016 Maier ..... D3/243
D798,046 S * 9/2017 Michele ..... D3/232
D803,554 S * 11/2017 Maier ..... D3/243
D803,555 S * 11/2017 Maier ..... D3/243
D807,638 S * 1/2018 Xu ..... D3/290
D809,296 S * 2/2018 Morszeck ..... D3/279
D816,335 S * 5/2018 Chen ..... D3/273
D817,638 S * 5/2018 Salander ..... D3/279
D818,706 S * 5/2018 Maier ..... D3/232
D821,098 S * 6/2018 Sheikh ..... D3/318
D830,693 S * 10/2018 Maeda ..... D3/289
(Continued)

*Primary Examiner* — Darlington Ly
(74) *Attorney, Agent, or Firm* — Dickinson Wright PLLC

(57) CLAIM

The ornamental design for a luggage shell with surface configuration, as shown and described.

DESCRIPTION

FIG. 1 is a perspective view of the luggage shell with surface configuration in a first environment showing a representative luggage shell in broken lines;
FIG. 2 is a front view thereof;
FIG. 3 is a rear view thereof;
FIG. 4 is a right side view thereof;
FIG. 5 is a left side view thereof;
FIG. 6 is a perspective view of the luggage shell with surface configuration in a second environment showing a representative piece of luggage in broken lines;
FIG. 7 is a front view thereof;
FIG. 8 is a rear view thereof;
FIG. 9 is a right side view thereof; and,
FIG. 10 is a left side view thereof.
The broken lines showing luggage are for the purposes of illustrating environment and forms no part of the claimed design.

1 Claim, 10 Drawing Sheets

Figure 1:
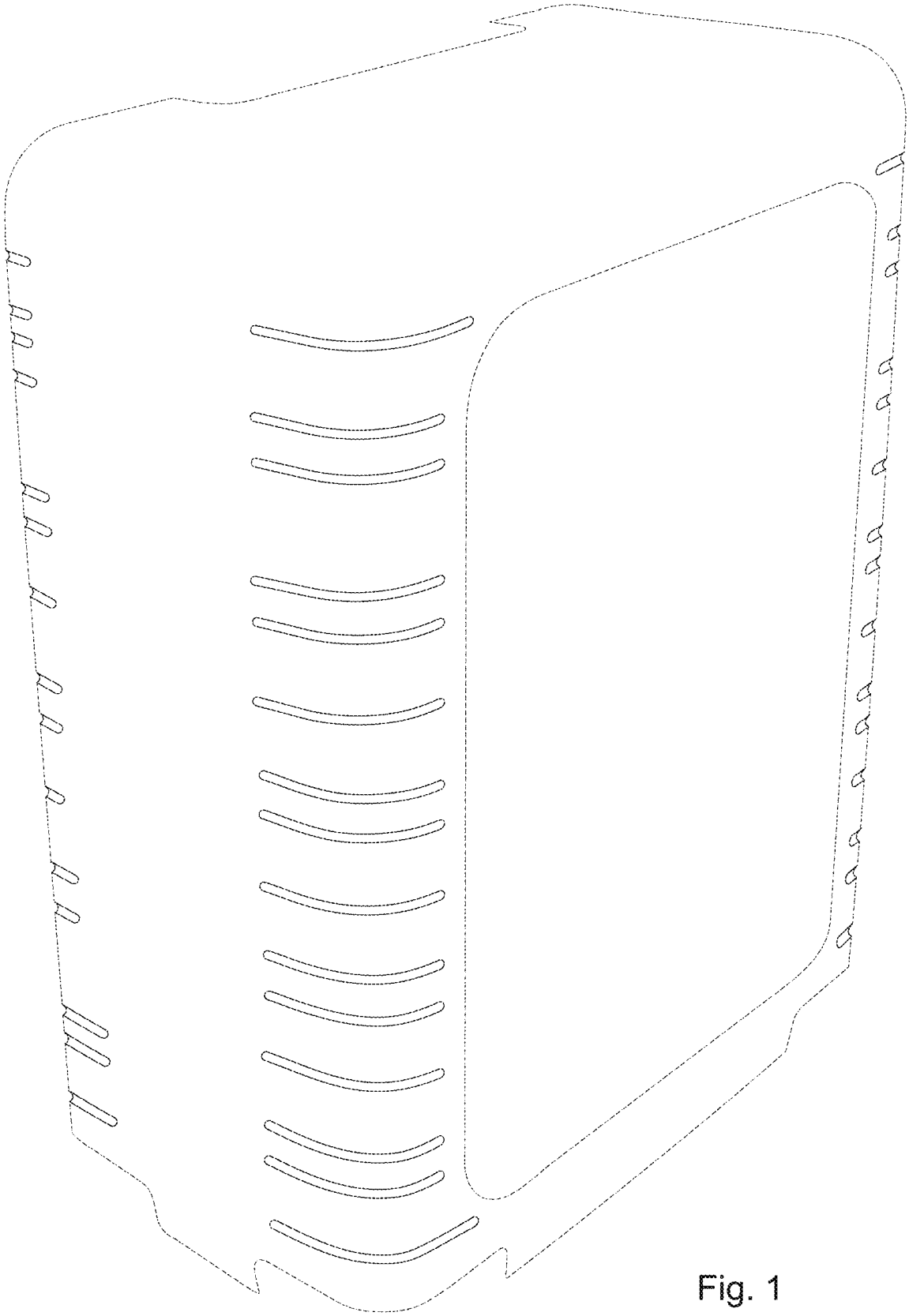
Figure 3:
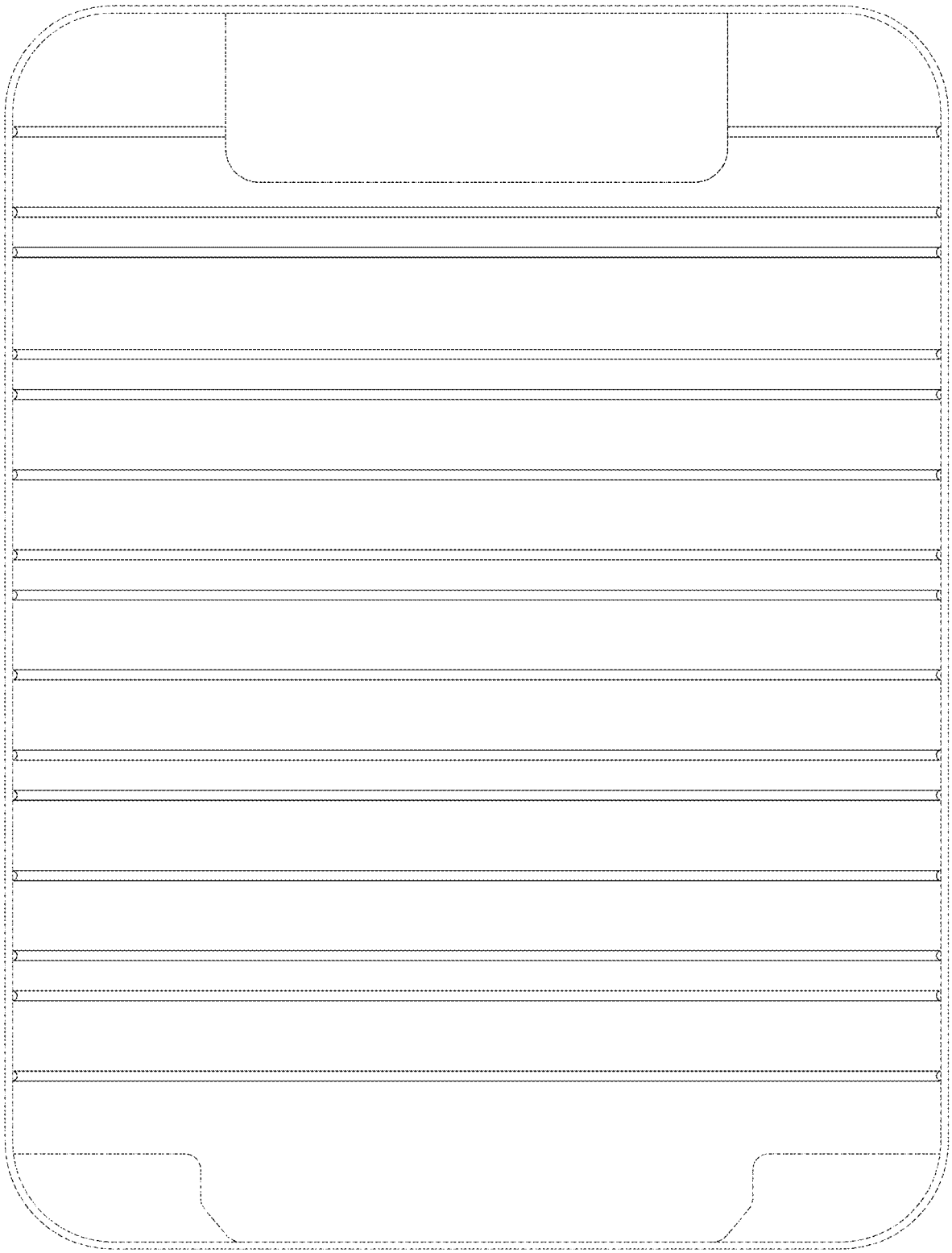
Figure 5:
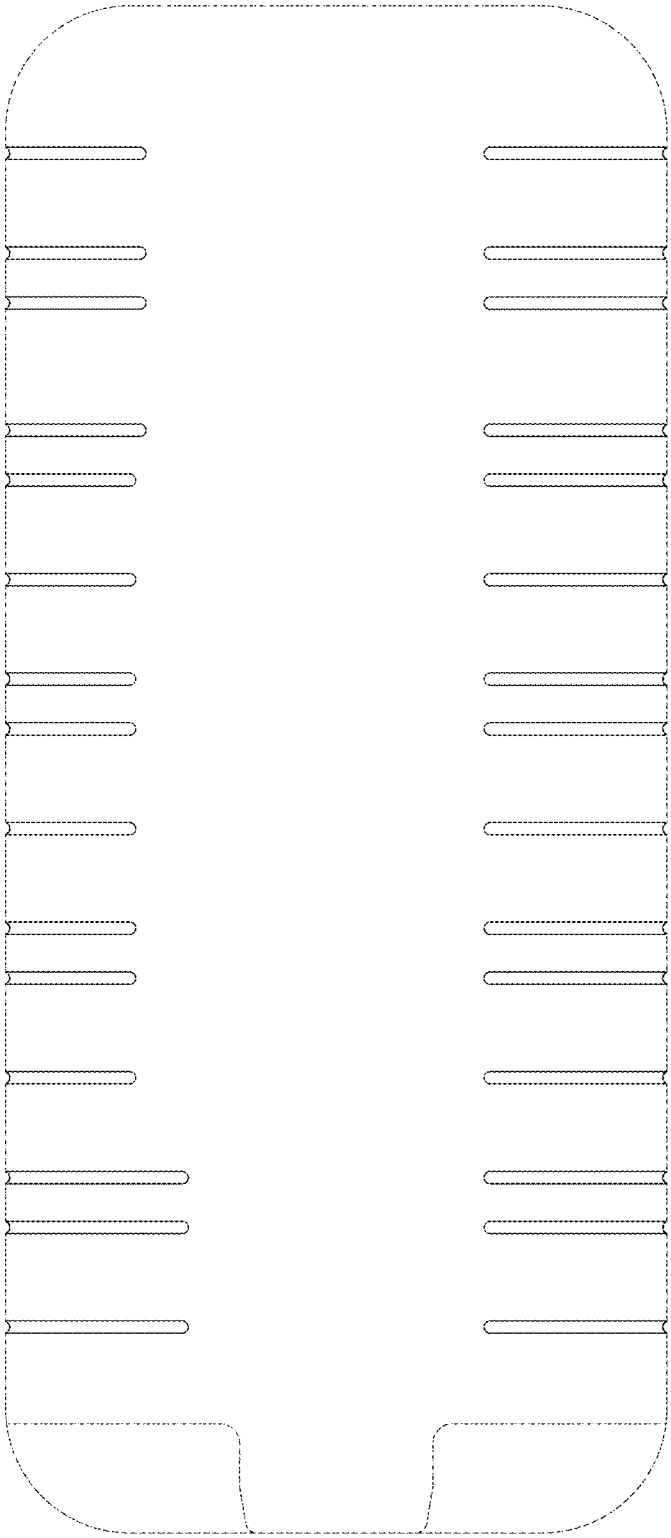
Figure 9:
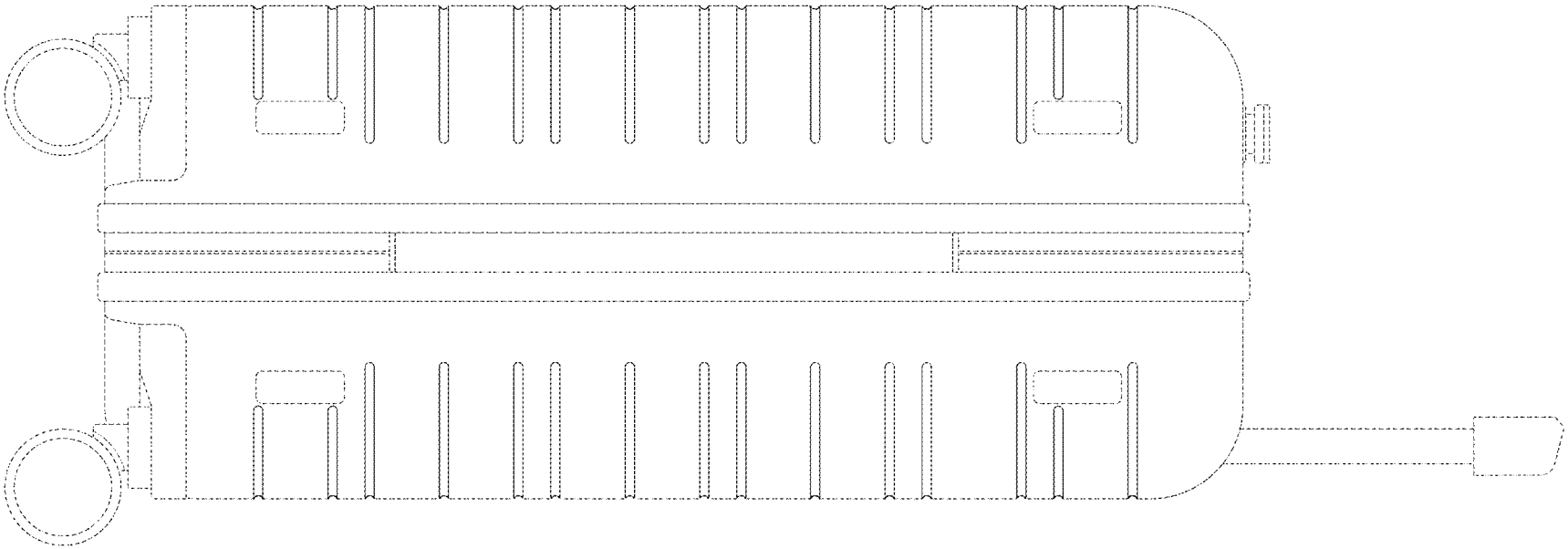
Figure 10:
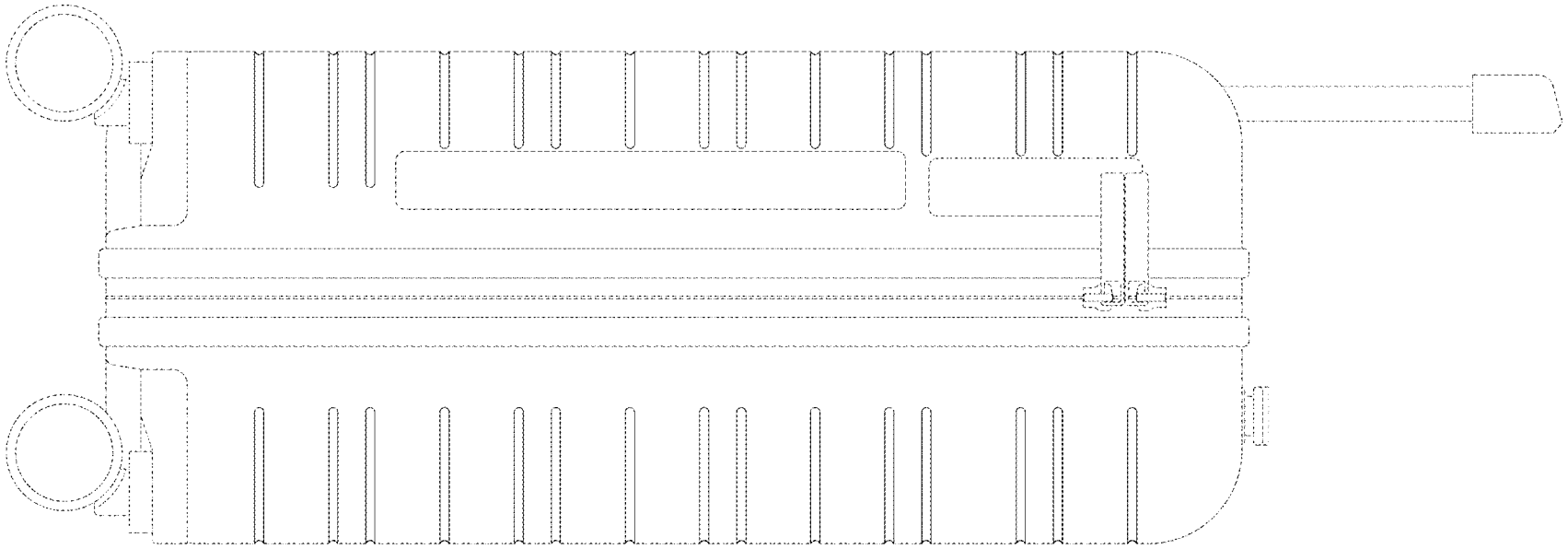

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D836,909 | S | * | 1/2019 | Karl | D3/279 |
| 10,194,722 | B2 | * | 2/2019 | Salander | A45C 5/14 |
| 10,292,469 | B2 | * | 5/2019 | Sijmons | A45C 5/02 |
| D852,498 | S | * | 7/2019 | Sassi | D3/243 |
| D885,761 | S | * | 6/2020 | Wu | D3/279 |
| D889,837 | S | * | 7/2020 | Roosen | A45C 5/06<br>D3/318 |
| D925,911 | S | * | 7/2021 | Sun | D3/279 |
| D946,891 | S | * | 3/2022 | Huang | D3/279 |
| 2017/0318926 | A1 | * | 11/2017 | Sijmons | A45C 5/03 |

* cited by examiner

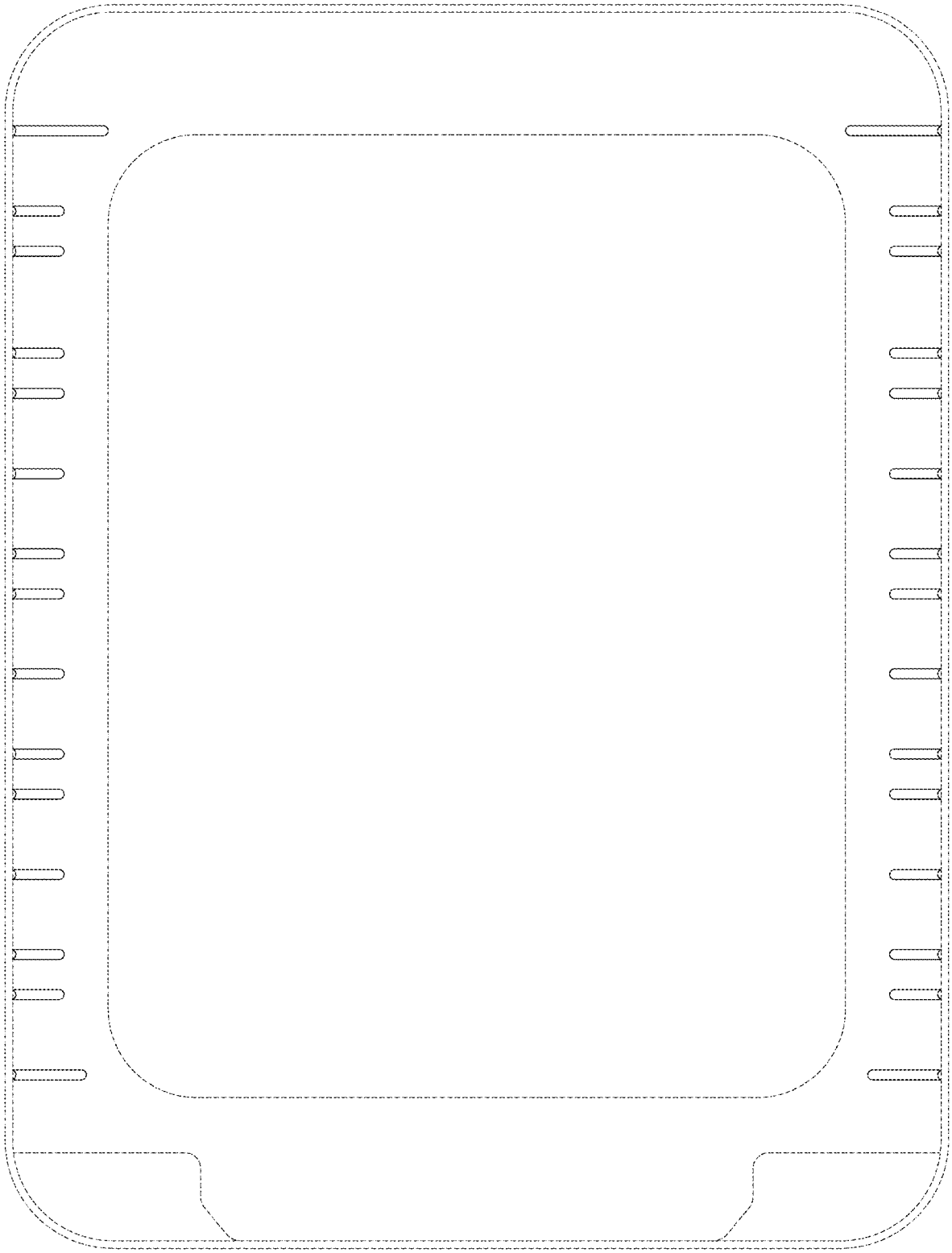
Fig. 2
(Amended)

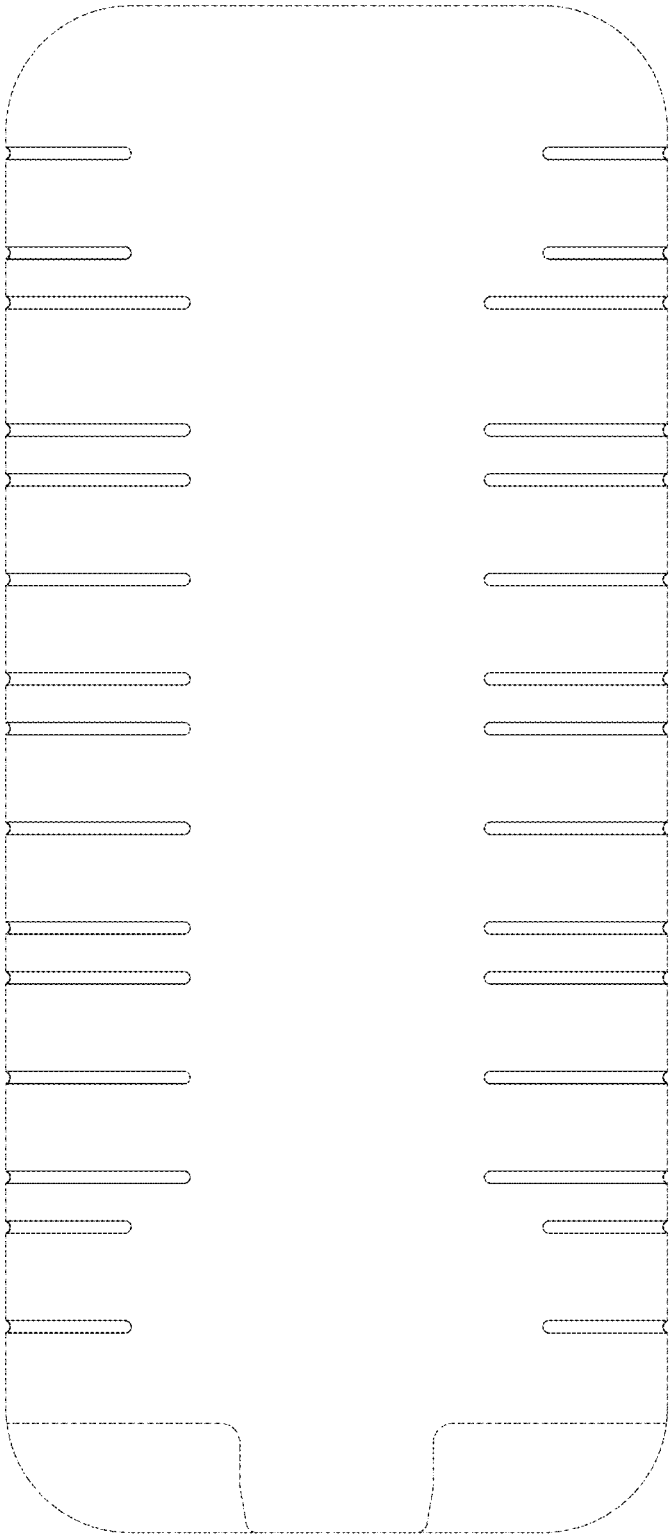
Fig. 4
(Amended)

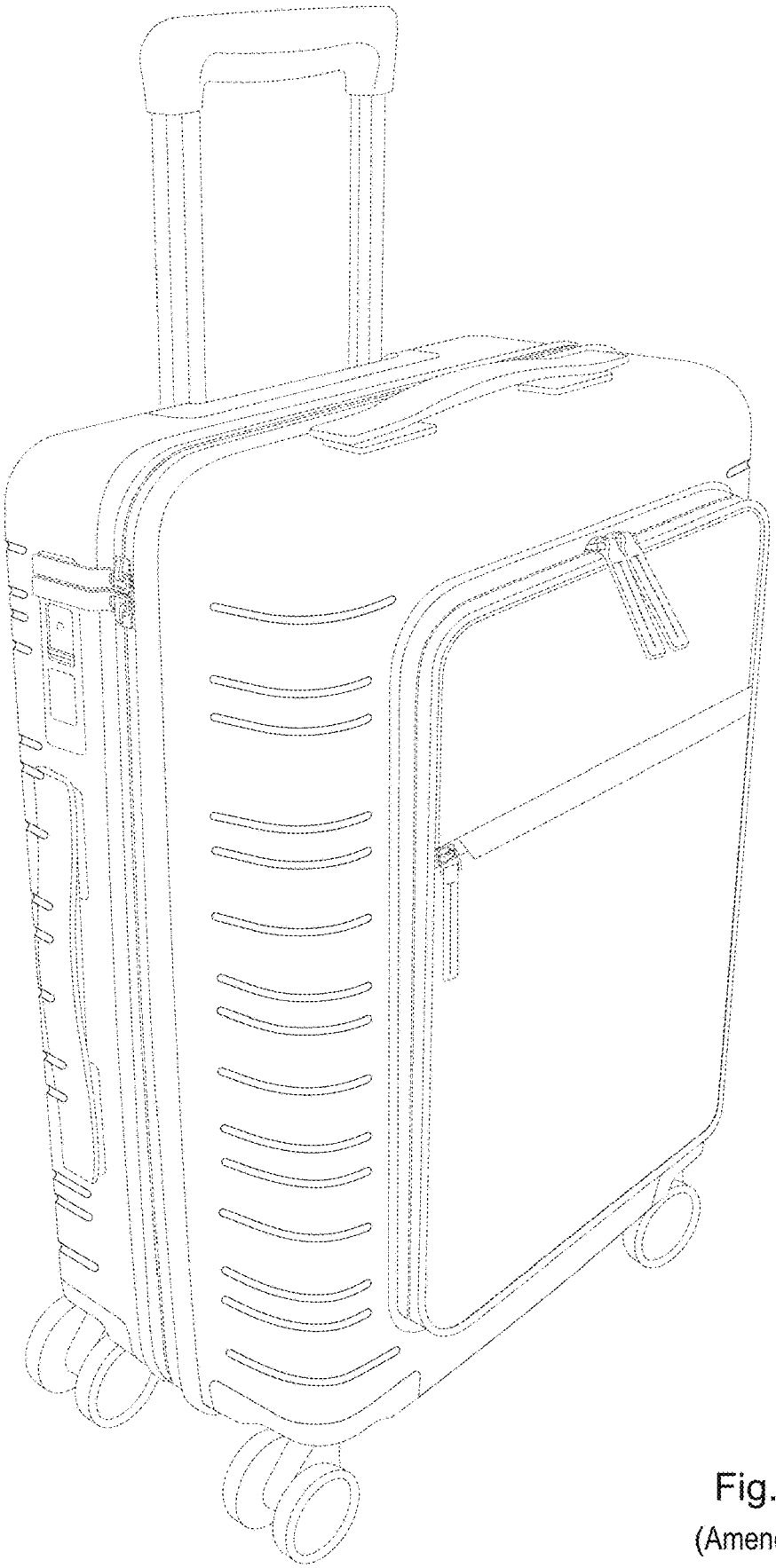
Fig. 6
(Amended)

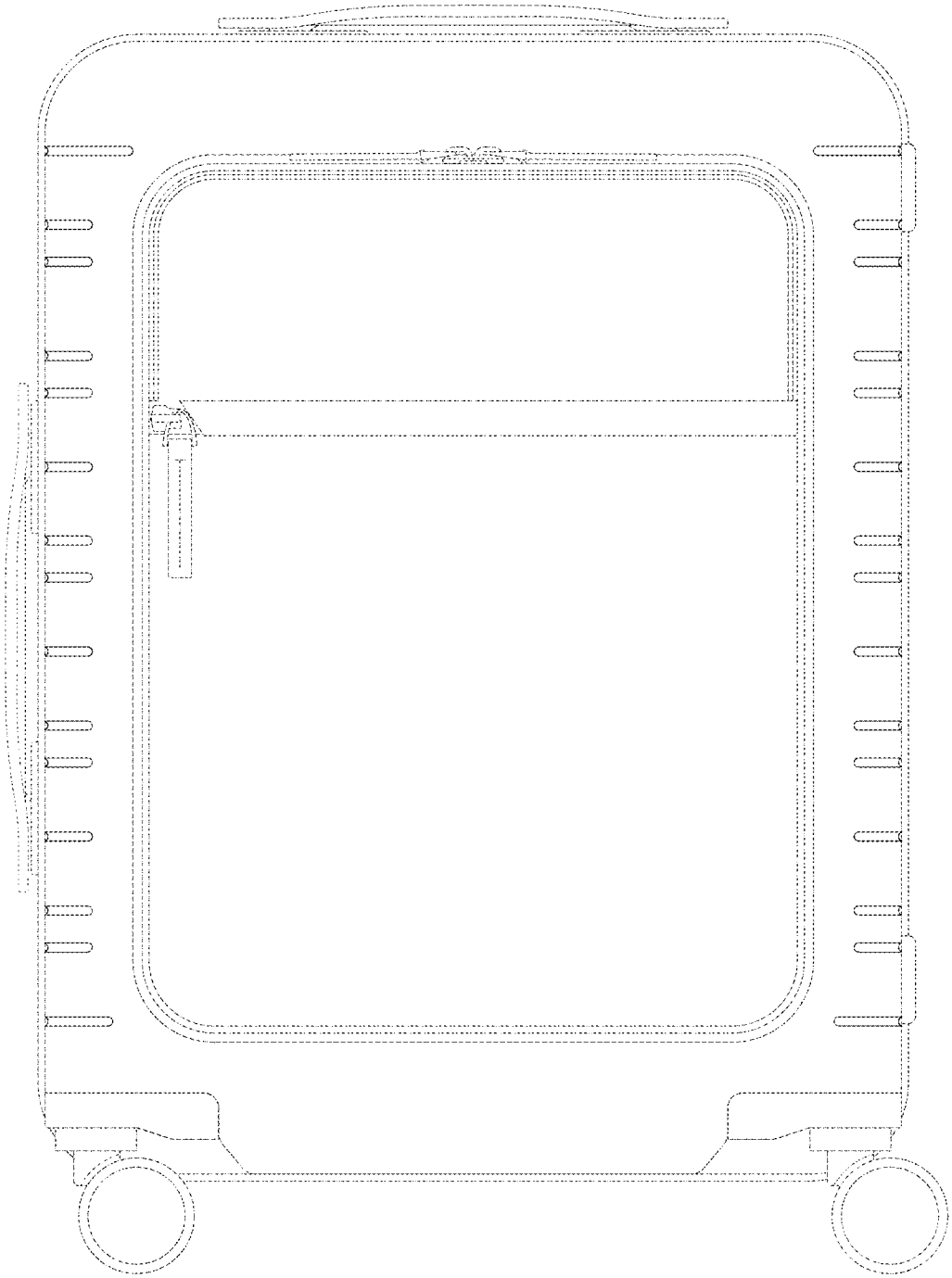
Fig. 7
(Amended)

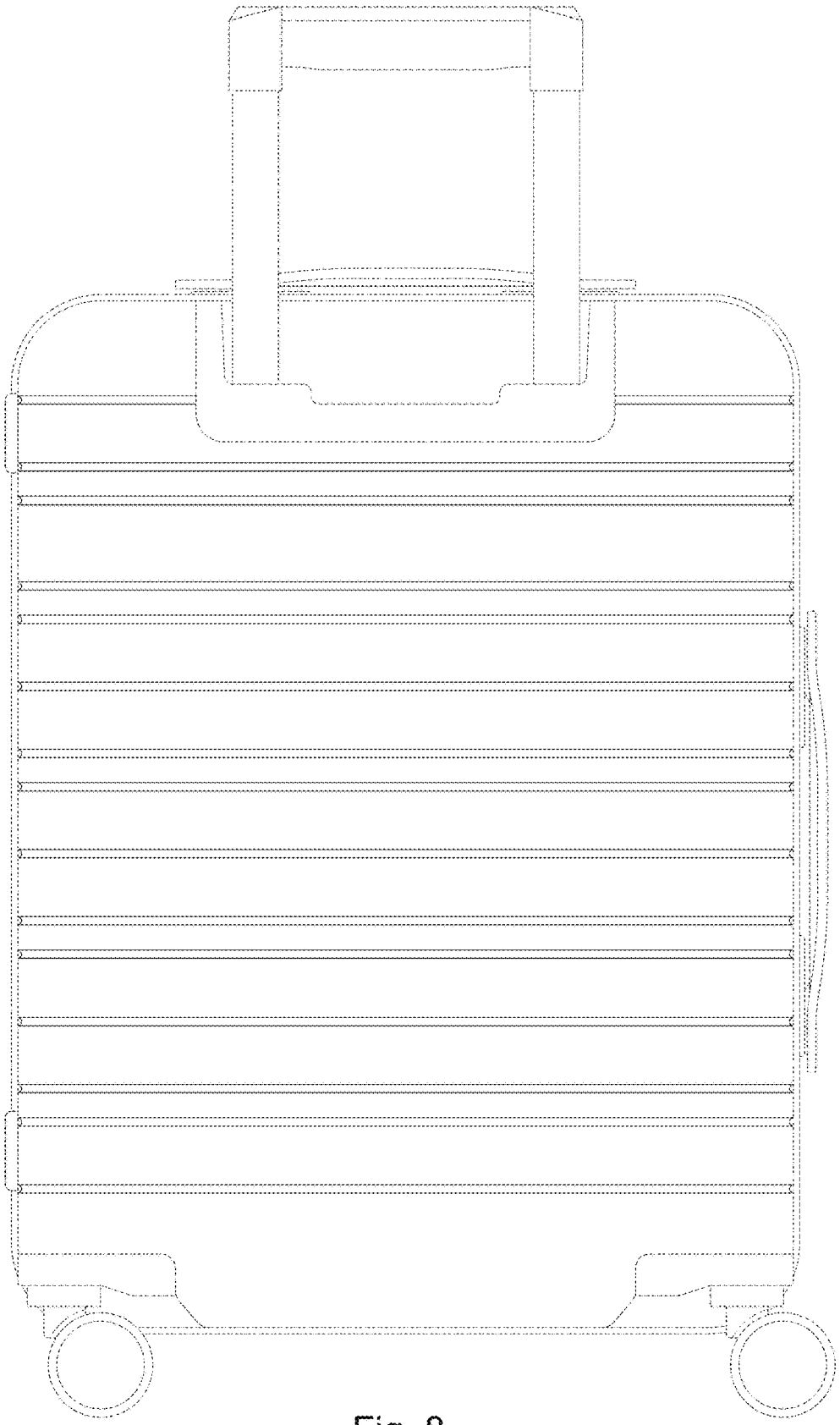
Fig. 8
(Amended)